UNITED STATES PATENT OFFICE.

MAX EMIL DÖNITZ, OF ZSCHIEREN, DRESDEN, GERMANY.

PROCESS FOR MAKING A FERMENTED BUT NON-ALCOHOLIC WINE.

1,152,154.  Specification of Letters Patent.  Patented Aug. 31, 1915.

No Drawing.  Application filed November 16, 1914.  Serial No. 872,444.

*To all whom it may concern:*

Be it known that I, MAX EMIL DÖNITZ, a citizen of the Kingdom of Prussia, German Empire, residing in Zschieren, Dresden, in the Kingdom of Saxony, in said Empire, have invented certain new and useful Improvements in a Process for Making a Fermented but Non-Alcoholic Wine, of which the following is a specification.

The known processes for manufacturing fermented but non-alcoholic wines are based on the principle, that the alcohol contained in the normally fermented wine or at least the greatest part of this alcohol is withdrawn therefrom by distilling *in vacuo*. Thereupon tartaric acid and sugar are added and the original volume is made up by a corresponding addition of water. The liquid is then impregnated with carbonic acid, bottled and rendered durable by pasteurization. The aromatic substances volatilized during the distilling process have in some cases also been collected and again added to the wine freed from alcohol as above described. In no way, however, has it hitherto been possible to produce a non-alcoholic wine which contains the full and real natural bouquet and aroma of the alcoholic wines. Contrary thereto wines are obtained according to the present invention, which, although freed in the above described manner of their alcohol, correspond with regard to aroma and flavor entirely with the ordinary alcoholic wines, and thereby favorably differ from the non-alcoholic wines produced in the usual way. The inventor obtains this result by a socalled "after-maturing" in the presence and by the coöperation of yeast cells. In view of the coöperation of yeast cells one may speak of a "fermentation" or of a "repeated fermentation." This fermentation, however, is not an alcoholic fermentation, as experience has shown, that it does not lead to the formation of fresh alcohol, on the contrary, to a reduction of the traces of alcohol which may have remained from the distillation of the original wine.

The detailed procedure is as follows: As initial material a grape or fruit wine is employed, which has been completely fermented, and contains only traces of non-fermented grape-sugar, thus has the usual contents in alcohol. The alcohol is then first driven off in known manner by distillation, preferably *in vacuo*. The distilling process is, preferably, carried so far, that about 50 per cent. of the initial volume passes over. The residue which is subjected to the further treatment contains only a few tenths per cent. (about 0.3 volume per cent.) of alcohol. By filling up this residue with pure water the initial volume is restored or a normal volume (*i. e.* a volume with a normal percentage of extractive matter) is formed. By this filling up the remaining alcohol is further reduced; say to about one half (or about 0.15 per cent. of the total volume) if 50 per cent. of the initial volume of wine were distilled off and the initial volume was restored. This intermediate product is then without addition of sugar submitted to the hereinbefore mentioned "after-maturing" or "non-alcoholic fermentation." The intermediate product may be simply filled into barrels or other vessels (filling the barrel preferably quite full, so that no air-filled space is left), whereupon such barrels are sealed (preferably by aid of the known fermenting bungs) and left to rest for several weeks at a temperature at which the growth of the yeast cells is possible. Fruit wines (in particular apple wine or cider) are generally after-matured in this way in 4 weeks, whereas grape wines require a longer period say about 12 weeks. It is advisable to aerate the liquid from time to time during this period. In consequence of such procedure a fermentation will appear which may be termed a natural or wild fermentation. That a fermentation is caused by the coöperation of yeast cells is obvious from the fact that the liquid first clouds and again clears, and that after this maturing process has been completed a distinct and characteristic, though not very large, precipitation of yeast is found. Thus the yeast cells which are everywhere present in the air or still contained in the distillate (the presence of which is possible owing to the moderate temperature of about 35° cent. during the distillation) must have come into effect and to a development. That it is actually a fermentation process is also evident from the formation of carbonic acid, even if in a small quantity only. By no means however, fresh alcohol is formed. Analyses have shown that the remnants of grape sugar contained in the initial material are sometimes a little reduced, but at the same time also a further reduction of the traces of alcohol contained in the up-filled residue of the distillation was proved.

The process may be carried out in a more rational manner by a fermentation in which a pure yeast culture is employed instead of the wild or natural fermentation. For this purpose the yeast cells, which may be contained in the residue of the distillation filled up with water are destroyed by pasteurization, the entrance of wild yeast cells from the air is avoided as far as possible and in their stead pure cultured wine yeast is added. Otherwise the procedure is the same as stated above, only the after-maturing process generally proceeds somewhat faster. By such means the defective results which might occur from wild fermentation are avoided and a finer product is obtained. Lastly the process may be carried out in such manner that the wild fermentation proceeds alongside of the fermentation with the finer yeast. In this case the pasteurization of the filled up residue of distillation may be dispensed with but pure yeast culture is added. With either of the hereinbefore specified procedures the so far finished non-alcoholic beverage is drawn off from the precipitated yeast and subjected preferably, to a storing in barrels. Also carbonic acid may be added to the beverage. The further treatment of the wine in the cellar may entirely correspond to that employed with alcoholic wines.

The procedure hereinbefore described yields, contrary to all hitherto existing opinion, a non-alcoholic beverage which in flavor and aroma fully resembles the alcoholic grape or fruit wines, which will keep also in barrels for an unlimited time and may also be shipped in barrels.

For sweetening the beverage, the sweetening material is preferably added immediately before consumption. Sugar may, however, also be added before shipment, in which case it will, however, be necessary to bottle and pasteurize the liquid.

I claim:

1. A process of making a fermented but non-alcoholic wine consisting in distilling off the alcohol from an alcoholic grape or fruit wine, filling up the residue of distillation with water, after-maturing this liquid under coöperation of yeast cells by storing at a temperature allowing of the development of the yeast cells, and drawing off of the after-matured beverage from the precipitated yeast.

2. A process of making a fermented but non-alcoholic wine consisting in distilling off the alcohol from an alcoholic grape or fruit wine, filling up the residue of distillation with water, adding pure wine yeast, after maturing this liquid under coöperation of yeast cells by storing at a temperature allowing of the development of the yeast cells, and drawing off the after-matured beverage from the precipitated yeast.

3. A process of making a fermented but non-alcoholic wine consisting in distilling off the alcohol from an alcoholic grape or fruit wine, filling up the residue of distillation with water, pasteurizing this liquid, adding pure wine yeast, after-maturing the liquid under coöperation of yeast cells by storing at a temperature allowing of the development of the yeast cells; drawing off the after-matured non-alcoholic beverage from the precipitated yeast.

4. A process of making a fermented but non-alcoholic wine consisting in distilling off the alcohol from an alcoholic grape or fruit wine, filling up the residue of distillation with water, after-maturing the liquid under coöperation of yeast cells by storing at a temperature allowing of the development of the yeast cells, drawing off the after-matured non-alcoholic beverage from the precipitated yeast and filling same into vessels and impregnating same with carbonic acid.

5. A process of making a fermented but non-alcoholic wine consisting in distilling off the alcohol from an alcoholic grape or fruit wine, filling up the residue of distillation with water, after-maturing the liquid under coöperation of yeast cells by storing at a temperature allowing of the development of the yeast cells, drawing off the after-matured non-alcoholic beverage from the precipitated yeast and filling same into vessels, adding sugar to same and impregnating same with carbonic acid and finally bottling same and pasteurizing it in the bottles.

In testimony, that I claim the foregoing as my invention, I have signed my name in presence of two subscribing witnesses.

MAX EMIL DÖNITZ.

Witnesses:
OTTO WOLFF,
C. J. HUGO DUMMER.